(12) United States Patent
Peyron et al.

(10) Patent No.: US 12,331,699 B2
(45) Date of Patent: Jun. 17, 2025

(54) ACTUATING SYSTEM FOR A CASCADE THRUST REVERSER

(71) Applicant: SAFRAN NACELLES, Gonfreville-l'Orcher (FR)

(72) Inventors: Vincent Jean-François Peyron, Moissy-Cramayel (FR); Patrick André Boileau, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/551,526

(22) PCT Filed: Mar. 22, 2022

(86) PCT No.: PCT/FR2022/050525
§ 371 (c)(1),
(2) Date: Sep. 20, 2023

(87) PCT Pub. No.: WO2022/200728
PCT Pub. Date: Sep. 29, 2022

(65) Prior Publication Data
US 2024/0175410 A1     May 30, 2024

(30) Foreign Application Priority Data
Mar. 25, 2021  (FR) ..................... 2103045

(51) Int. Cl.
*F02K 1/76*     (2006.01)
*F02K 1/72*     (2006.01)

(52) U.S. Cl.
CPC ............... *F02K 1/763* (2013.01); *F02K 1/72* (2013.01); *F02K 1/766* (2013.01); *F05D 2220/323* (2013.01); *F05D 2240/129* (2013.01)

(58) Field of Classification Search
CPC ... F02K 1/56; F02K 1/566; F02K 1/62; F02K 1/625; F02K 1/68; F02K 1/70
See application file for complete search history.

(56) References Cited

U.S. PATENT DOCUMENTS

| 4,232,516 A * | 11/1980 | Lewis | ........................ F02K 1/72 239/265.31 |
| 4,278,220 A * | 7/1981 | Johnston | .................... F02K 1/72 244/110 B |
| 6,385,964 B2 * | 5/2002 | Jean | ......................... F02K 1/72 239/265.29 |

(Continued)

FOREIGN PATENT DOCUMENTS

| FR | 2 965 588 A1 | 4/2012 |
| FR | 2 983 173 A1 | 5/2013 |
| FR | 3 059 299 A1 | 6/2018 |

OTHER PUBLICATIONS

International Search Report & Written Opinion Issued Jun. 23, 2022, in PCT/FR2022/050525, filed on Mar. 22, 2022, citing documents 1-3 & 15-17 therein, 16 pages.

(Continued)

*Primary Examiner* — Thuyhang N Nguyen
(74) *Attorney, Agent, or Firm* — Oblon, McClelland, Maier & Neustadt, L.L.P.

(57) ABSTRACT

A thrust reverser includes a jack for translational actuation of a movable part, the jack being a screw jack without an extension tube.

13 Claims, 7 Drawing Sheets

(56) References Cited

U.S. PATENT DOCUMENTS

| | | | | |
|---|---|---|---|---|
| 6,546,715 | B1* | 4/2003 | Blevins | F02K 1/72 |
| | | | | 239/265.29 |
| 7,559,507 | B2* | 7/2009 | Harrison | F02K 1/766 |
| | | | | 60/228 |
| 2010/0192715 | A1* | 8/2010 | Vauchel | F16H 25/2056 |
| | | | | 74/89.35 |
| 2013/0277454 | A1 | 10/2013 | Hurlin et al. | |
| 2014/0271163 | A1 | 9/2014 | Hue et al. | |
| 2019/0316545 | A1 | 10/2019 | Heau et al. | |

OTHER PUBLICATIONS

French Search Report Issued Dec. 1, 2021 in French Application 2103045, filed on Mar. 25, 2021, citing documents 1-3 & 15-17 therein, 10 pages with Written Opinion & Translation of Categories.

\* cited by examiner

ACTUATING SYSTEM FOR A CASCADE THRUST REVERSER

TECHNICAL FIELD

The invention relates to the field of the thrust reversers for aircraft propulsion units and, more specifically, to the actuating system of such thrust reversers.

The invention is of particular interest for the cascade thrust reversers, in particular but without limitation when the cascades are sliding.

STATE OF THE PRIOR ART

A conventional cascade thrust reverser comprises a portion which is mobile in longitudinal translation between a direct thrust position and a thrust reversal position under the action of an actuating system including mechanical jacks and one or more electric motors.

A mechanical thrust reverser jack typically comprises a screw and a nut which cooperate with each other via balls so as to form a helical connection. A rotation of the screw relative to the nut thus causes a translation of the screw relative to the nut, and vice versa. A conventional thrust reverser jack further comprises an extension tube secured to the nut and forming a housing for the screw.

In order to be able to displace the movable portion between the direct thrust and movable portion positions, one end of the screw is connected to the movable portion while the nut is connected to a fixed portion of the thrust reverser, or vice versa.

Among other drawbacks, a cylinder thus arranged is subjected to mechanical stresses leading to a risk of buckling of the screw, taking into account in particular the distance separating the nut and the connecting end of the screw.

DISCLOSURE OF INVENTION

An object of the invention is to provide a thrust reverser of the cascade type allowing reducing the drawbacks associated with conventional mechanical jacks and in particular reducing the risk of buckling.

Another object of the invention is to provide an actuating system allowing reducing the mass of the thrust reverser and the manufacturing cost thereof.

The invention also aims to improve the aerodynamic performance of the propulsion unit, in particular in the thrust reversal configuration.

To this end, the invention relates to a thrust reverser for an aircraft propulsion unit, comprising a fixed portion, a movable portion and at least one actuator, the actuator comprising a first member and a second member which cooperate with each other so as to be able to be displaced relative to each other between a first position and a second position defining a stroke of the actuator, one of the first member and the second member being connected to the fixed portion of the thrust reverser by a first connecting element, the other of the first member and the second member being connected to the movable portion of the thrust reverser by a second connecting element, the thrust reverser being configured such that a displacement of the first member and the second member relative to each other between the first and second positions causes a translational displacement of the movable portion relative to the fixed portion respectively between a direct thrust position and a thrust reversal position.

According to the invention, when the first member and the second member are relative to each other in the first position, the distance between the first connecting element and the second connecting element is less than the stroke of the actuator.

This mounting principle allows very significantly reducing the risk of buckling, in particular when the actuator is deployed, that is to say when the first and second members are relative to each other in the second position and the movable portion of the thrust reverser is in the thrust reversal position.

The actuator is preferably a screw jack, the screw forming said first member, the jack comprising a nut cooperating with the screw and forming said second member.

Preferably, the thrust reverser comprises a damping element receiving one end of the screw when the movable portion is in the direct thrust position, said screw end being located at a distance from the damping element when the movable portion is in the thrust reversal position. Rather than leaving this screw end cantilevered in a direct thrust configuration, the cooperation thereof with the damping element advantageously allows limiting the vibrations of the screw of the jack.

Alternatively, the end of the screw is embedded in a front or rear frame of cascades, these frames are conventionally used to support and fasten the cascades at the front and rear ends thereof, respectively. The term "embedding", means at least one blocking in translation, according to the direction of the screw preferably corresponding to the axial direction, of the end of the screw relative to the front or rear frame of the cascades. However, a pivot connection or ball joint is possible between these two elements, for example via a bearing arranged at the interface between the two.

In one embodiment, the actuator is devoid of an extension tube.

In the field of the screw jack type actuators, an extension tube designates a member forming a housing for the screw and whose length is close to or identical to that of the stroke of the jack, such that the screw is almost completely housed in the tube when the jack is retracted.

The removal of the extension tube allows reducing the mass, the space requirement and the manufacturing cost of the actuator.

The compactness of an actuator without an extension tube also allows reducing the obstruction of the cascades by the actuator and/or increasing the performance of the propulsion unit.

According to a first variant, the movable portion of the thrust reverser comprises cascade vanes.

Within the scope of this first variant, the second connecting element preferably cooperates with a front or rear frame of the cascades.

According to a second variant, the thrust reverser comprises fixed cascade vanes.

In one embodiment, the thrust reverser comprises a tertiary lock connected to the fixed portion.

For example, the tertiary lock can be connected to a fan casing of the thrust reverser and configured to cooperate with the movable portion, for example with the front frame or the rear frame of the cascades.

On the one hand, such an integration of the tertiary lock is made possible by the configuration of the actuator which allows having the space required for this purpose while maintaining a high level of safety, for example in the case of bursting of a disc of the motor.

On the other hand, a tertiary lock thus configured allows eliminating a reinforcement or extension structure and/or modifying the aerodynamic lines of the thrust reverser.

This results in a gain in terms of mass and performance of the propulsion unit.

In one embodiment, the first connecting element cooperates with a front frame of the fixed portion.

The invention also relates to a propulsion unit for an aircraft, comprising a thrust reverser as defined above.

In one embodiment, the propulsion unit comprises a fan casing, the first connecting element cooperating with the fan casing.

Other advantages and features of the invention will appear on reading the following detailed, non-limiting description.

BRIEF DESCRIPTION OF THE DRAWINGS

The following detailed description refers to the appended drawings in which.

DETAILED DESCRIPTION OF EMBODIMENTS

Figure 1:
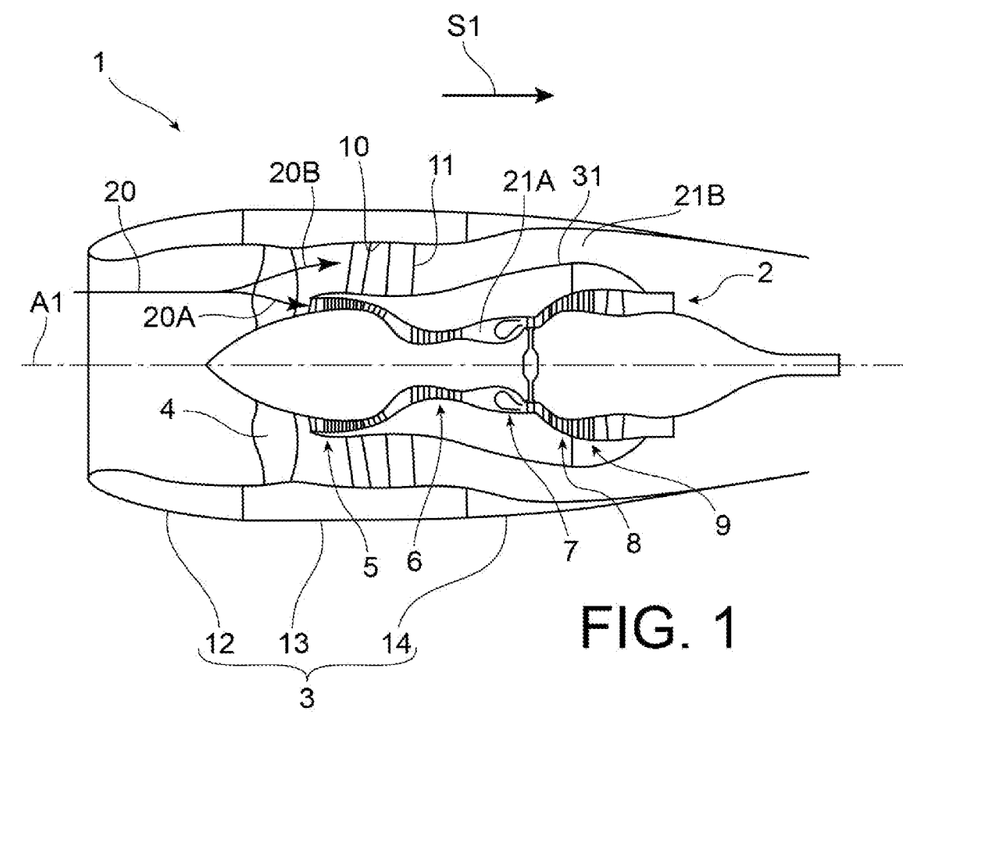
FIG. 1 is a schematic view in longitudinal section of an aircraft propulsion unit.

An aircraft propulsion unit 1 having a longitudinal central axis A1 is represented in FIG. 1.

Subsequently, the terms "front" and "rear" are defined relative to a direction S1 of gas flow through the propulsion unit 1 along the axis A1 when said propulsion unit generates thrust.

The propulsion unit 1 comprises a turbomachine 2 and a nacelle 3.

In this example, the turbomachine 2 is a bypass turbojet engine comprising, from front to rear, a fan 4, a low pressure compressor 5, a high pressure compressor 6, a combustion chamber 7, a high pressure turbine 8 and a low pressure turbine 9. The compressors 5 and 6, the combustion chamber 7 and the turbines 8 and 9 form a gas generator. The turbojet engine 2 is equipped with a fan casing 10 connected to the gas generator by structural arms 11.

The nacelle 3 comprises a front section forming an air inlet 12, a middle section which includes fan cowls 13 enveloping the fan casing 10 and a rear section 14.

In operation, an airflow 20 enters the propulsion unit 1 through the air inlet 12, passes through the fan 4 then is divided into a central primary flow 20A and a secondary flow 20B. The primary flow 20A flows in a primary flow path 21A for gas circulation passing through the gas generator. The secondary flow 20B flows in a secondary flow path 21B surrounding the gas generator and delimited radially outwardly by the nacelle 3.

Figure 2:
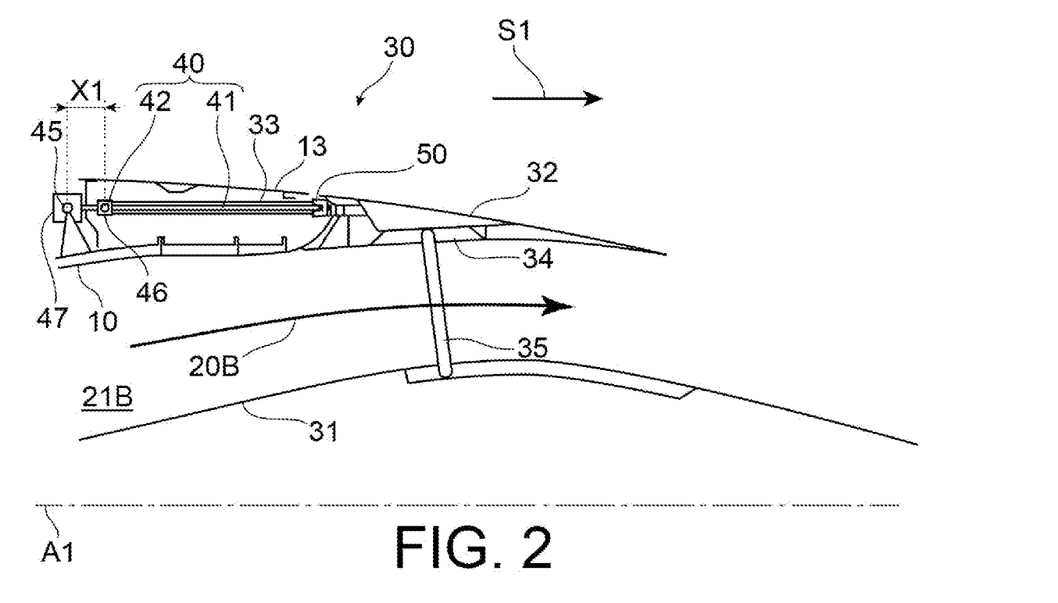
FIG. 2 is a schematic half-view in longitudinal section of a thrust reverser in accordance with a first embodiment of the invention, in the direct thrust configuration.
Figure 3:
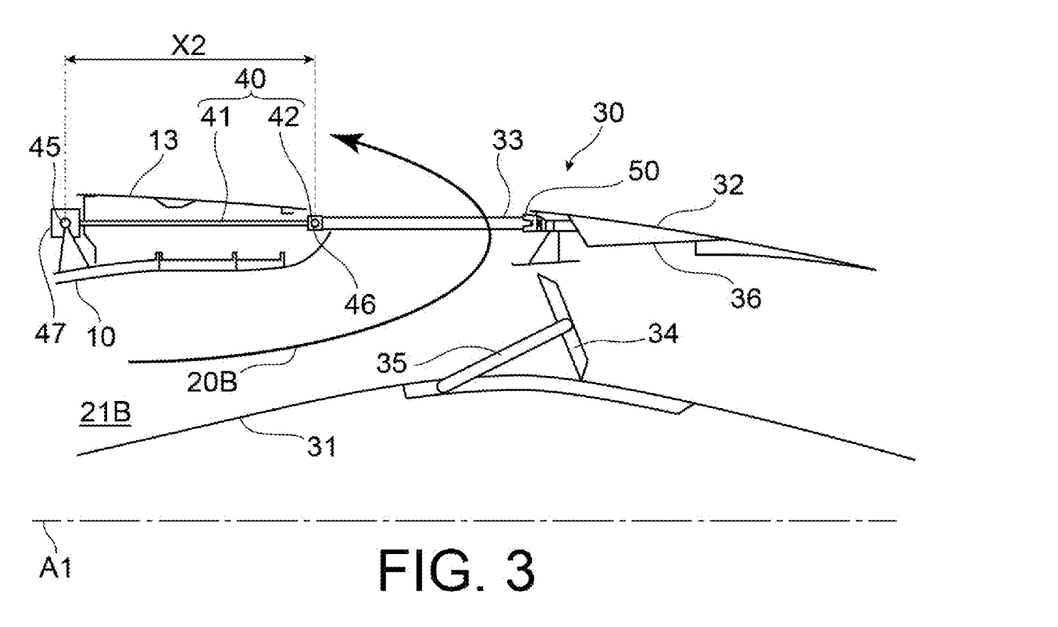
FIG. 3 is a schematic half-view in longitudinal section of the thrust reverser of FIG. 2, in the thrust reversal configuration.

FIGS. 2 and 3 illustrate a thrust reverser 30 in accordance with a first embodiment of the invention.

In the following description, it is considered that the thrust reverser 30 belongs to the propulsion unit 1 of FIG. 1. Of course, the thrust reverser 30 is likely to equip a propulsion unit different from that of FIG. 1.

The thrust reverser 30 comprises, on the one hand, a fixed portion formed in this example by the fan casing 10, the fan cowls 13 and an inner fixed structure 31 enveloping the gas generator and delimiting radially inwardly the secondary flow path 21B.

The thrust reverser 30 comprises, on the other hand, a movable portion, which can be displaced relative to the aforementioned fixed portion.

In the embodiment of FIGS. 2 and 3, the movable portion of the thrust reverser 30 includes a movable cowl 32 forming the rear section 14 of the nacelle 3, cascade vanes 33, shutter flaps 34 and connecting rods 35.

FIG. 2 shows the thrust reverser 30 in a direct thrust configuration.

In this configuration, the movable cowl 32 is in a closed position, or forward position, in which it bears axially on the fan casing 10 and in which the cascades 33 are housed in a space delimited radially by the fan casing 10, on the one hand, and by the fan cowls 13, on the other hand.

In the direct thrust configuration, the shutter flaps 34 are retracted within a cavity 36 formed by the movable cowl 32.

The thrust reverser 30 thus allows channelling the secondary flow 20B towards the rear of the propulsion unit 1 so as to generate a thrust.

FIG. 3 shows the thrust reverser 30 in a thrust reversal configuration.

In this configuration, the movable cowl 32 is in an open position, or retracted position, in which it is axially remote from the fan casing 10 so as to define a radial opening of the secondary flow path 21B. The cascades 33 extend through this radial opening, that is to say axially between a rear end of the fan casing 10 and a front end of the movable cowl 32.

In the thrust reversal configuration, the shutter flaps 34 are deployed radially in the secondary flow path 21B so as to direct the secondary flow 20B towards the cascades 33 which allow orienting the flow thus redirected towards the front of the propulsion unit 1 in order to generate a counter-thrust.

The thrust reverser 30 comprises an actuating system allowing displacing the movable portion between the direct thrust and thrust reversal configurations.

In the embodiment of FIGS. 2 and 3, the actuating system is more specifically configured to simultaneously displace the movable cowl 32 and the cascades 33 in translation along the axis A1.

In this example, the cascades 33 comprise a rear frame secured to a front end of the movable cowl 32, such that a translation of one of the movable cowl 32 and the cascades 33 causes a corresponding translation of the other of the movable cowl 32 and the cascades 33.

The displacement of the movable cowl 32 between the open and closed positions causes a displacement of the flaps 34 between the deployed and retracted positions, respectively, under the action of the connecting rods 35. Conventionally, each flap 34 is hinged, on the one hand, to the movable cowl 32 and, on the other hand, to one of the ends of a respective one of the connecting rods 35, the other end of the connecting rods 35 being hinged to the inner fixed structure 31.

The invention relates more specifically to the structure and to the configuration of the actuating system.

In this example, the actuating system comprises a mechanical jack 40 of the ball screw jack type, that is to say comprising a screw 41 and a nut 42 which cooperate with each other via balls to form a helical connection.

The jack 40 is in this example driven by a conventional electric motor (not represented).

Of course, the actuating system can comprise several jacks similar to the jack 40 which act simultaneously on the movable portion of the thrust reverser 30, as well as one or more electric motors for driving the jack(s). The following description applies by analogy to each of the jacks of such an actuating system.

In the embodiment of FIGS. 2 and 3, the screw 41 of the jack 40 comprises a front end connected to the fan casing 10 by a first connecting element 45 and the nut 42 is connected to a front frame of the cascades 33 by a second connecting element 46.

The actuating system comprises a movement transmission mechanism 47 including, in this example, pinions (not represented) allowing driving the screw 41 of the jack 40 in rotation under the action of the motor.

In this example, the pinions are conical and cooperate, on the one hand, with the front end of the screw 41, that is to say at the first connecting element 45, and on the other hand, with an input shaft (not represented) extending circumferentially and being connected to the motor via a flexible shaft (not represented).

The second connecting element 46 fixedly connects the nut 42 to the front frame of the cascades 33 and comprises a hinge system such as a universal joint or a ball joint allowing limiting the bending in the screw 41 which could be generated by radial and tangential relative displacements between the front end of the screw 41 and the nut 42, whether in the direct thrust or thrust reversal configuration.

Thus, the screw 41 and the nut 42 cooperate with each other such that, when the screw 41 is driven in rotation by the motor, the nut 42 translates relative to the screw 41 between a first position, illustrated in FIG. 2, and a second position, illustrated in FIG. 3.

The screw 41 being axially held by the first connecting element 45 relative to the fixed portion of the thrust reverser 30 and the nut 42 being secured to the cascades 33, the translation of the nut 42 relative to the screw 41 results by a translation of the nut 42 relative to the fixed portion of the thrust reverser 30 and consequently by a corresponding translation of the cascades 33 relative to the fixed portion of the thrust reverser 30.

When the nut 42 is in the first position, the second connecting element 46 is located at an axial distance X1 from the first connecting element 45 (FIG. 2). When the nut 42 is in the second position, the second connecting element 46 is located at an axial distance X2 from the first connecting element 45 (FIG. 3).

The difference between the distances X2 and X1, that is to say the distance between the first and second positions of the nut 42, defines a stroke of the nut 42, also called stroke of the jack 40.

In this example, the stroke of the jack 40 corresponds to a distance close to the length of screw 41, which in this case is greater than 80% of the length of screw 41 (see FIGS. 2 and 3).

The jack 40 is configured such that the translation of the nut 42 between the first and second positions causes a corresponding translation of the cascades 33 and of the movable cowl 32 respectively between the direct thrust position and the thrust reversal position.

With reference to FIG. 2, the distance X1 separating the first connecting element 45 from the second connecting element 46, when the nut 42 is in the first position, is less than the stroke of the jack 40.

As a result, the distance X2 separating the first connecting element 45 from the second connecting element 46 when the nut 42 is in the second position (FIG. 3) is close to the length of the screw 41, which allows significantly reducing the risk of buckling of the jack 40 relative to a conventional thrust reverser jack.

Indeed, a conventional thrust reverser jack comprises an extension tube secured to the nut whose length is at least equal to the stroke of the jack such that, when the jack is deployed, the distance between the fastening ends of the jack is very much greater than the stroke of the jack, for example close to twice the cylinder stroke.

In the thrust reversal configuration (FIG. 3), the forces applied to the movable portion of the thrust reverser 30 and in particular on the movable cowl 32 pass through point structural elements which connect the rear frame and the front frame of the cascades 33 to each other.

Thus, the portion of the cascades 33 fulfilling the deflection function and which is carried by the front and rear frames can be non-structural and, given the absence of extension tube 25, have a maximised surface.

Moreover, in the thrust reversal configuration (FIG. 3), the screw 41 extends axially in front of the cascades 33 such that no element of the jack 40 hinders the flow used to generate the counter-thrust.

In this embodiment, when the thrust reverser 30 passes from the configuration of FIG. 3 to that of FIG. 2, the screw 41 penetrates into the thickness of the cascades 33. In a variant, the screw 41 can be arranged to extend radially inside the cascades 33.

The thrust reverser 30 comprises in this example a damping element 50 secured to the rear frame of the cascades 33 and configured to receive the rear end of the screw 41 when the thrust reverser 30 is in the direct thrust configuration (FIG. 2) so as to limit the vibrations of the screw 41.

The damping element 50 is in this example an elastically deformable conical part, and in which the concerned screw end is intended to penetrate in the direct thrust configuration. However, in the thrust reversal configuration, this same screw end is at an axial distance from the damping element 50. In this embodiment, this is explained by the fact that the screw 41 remains fixed axially, while the damping element 50 is integrated into the movable portion of the thrust reverser. Indeed, in the embodiment of FIGS. 2 and 3, the screw 41 is movable in rotation and stationary in translation, while the nut 42 is movable in translation and stationary in rotation.

The damping element 50 can be a sheet metal part made of stainless steel, in order to have the required features of elasticity, as previously mentioned. This part is also made to provide a resistance to friction, necessary because of the relative movements in translation and in rotation between the screw and this damping element. Finally, it is also preferably made so as to confer a resistance to corrosion.

Figure 4:
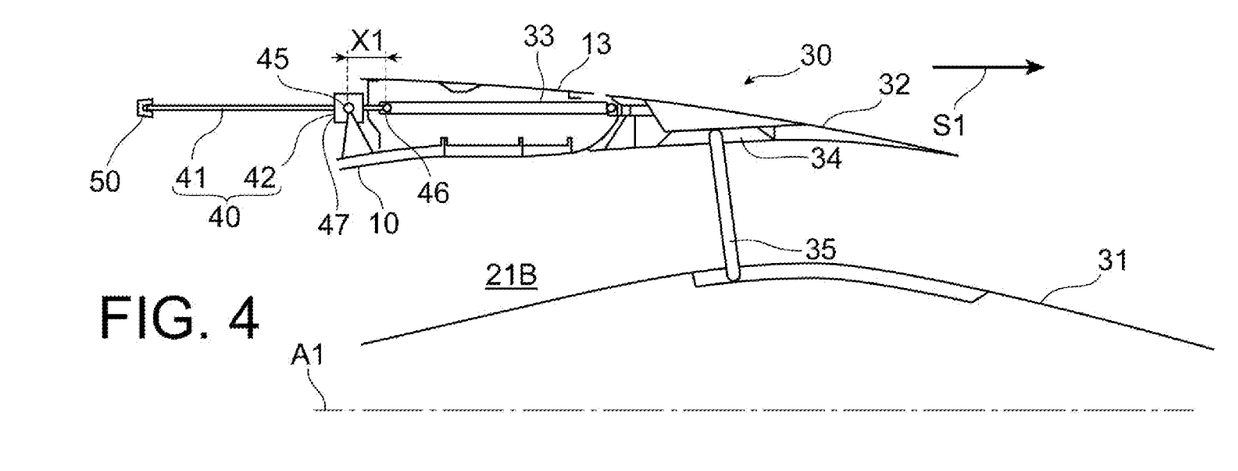
FIG. 4 is a schematic half-view in longitudinal section of a thrust reverser in accordance with a second embodiment of the invention, in the direct thrust configuration.
Figure 5:
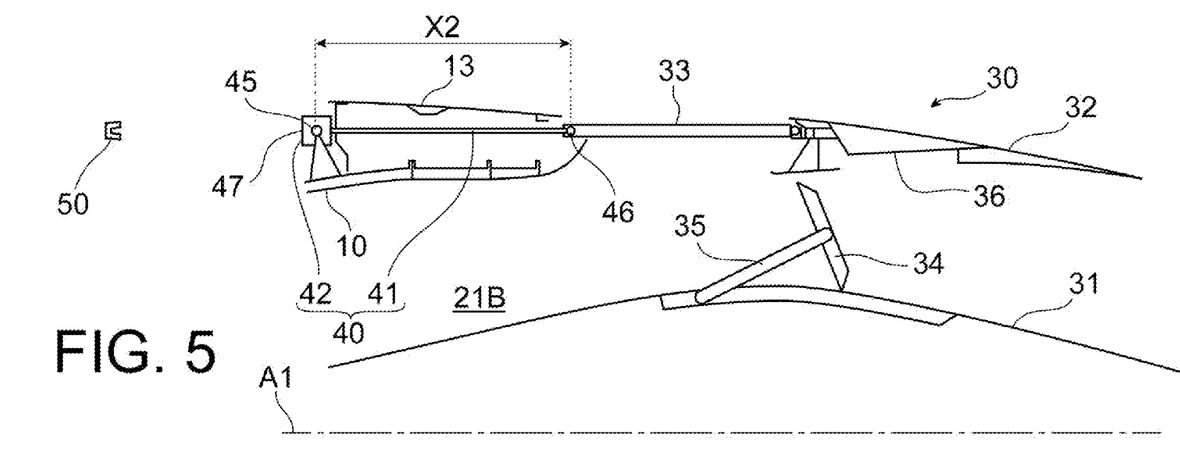
FIG. 5 is a schematic half-view in longitudinal section of the thrust reverser of FIG. 4, in the thrust reversal configuration.

FIGS. 4 and 5 illustrate a second embodiment having a reverse mounting relative to that of FIGS. 2 and 3, that is to say in which the screw 41 of the jack 40 is movable in translation and stationary in rotation while the nut 42 of the jack 40 is movable in rotation and stationary in translation.

The thrust reverser 30 of FIGS. 4 and 5 is described only according to the differences thereof relative to that of FIGS. 2 and 3.

In this second embodiment, the nut 42 of the jack 40 is connected to the fan casing 10 by the first connecting element 45 and the screw 41 of the jack 40 comprises a rear end connected to the front frame of the cascades 33 by the second connecting element 46.

The movement transmission mechanism 47 includes, in this example, pinions (not represented) allowing driving the nut 42 of the jack 40 in rotation under the action of the motor.

The second connecting element 46 fixedly connects the screw 41 to the front frame of the cascades 33 and comprises a hinge system such as a ball joint allowing limiting the bending in the screw 41 which could be generated by radial and tangential relative displacements between the nut 42 of the jack 40 and the rear end of the screw 41, whether in the direct thrust or thrust reversal configuration.

Thus, the screw 41 and the nut 42 cooperate with each other such that, when the nut 42 is driven in rotation by the motor, the screw 41 translates relative to the nut 42 between a first position, illustrated in FIG. 4, and a second position, illustrated in FIG. 5.

The nut 42 being axially held by the first connecting element 45 relative to the fixed portion of the thrust reverser 30 and the screw 41 being secured to the cascades 33, the translation of the screw 41 relative to the nut 42 results by a translation of the screw 41 relative to the fixed portion of the thrust reverser 30 and consequently by a corresponding translation of the cascades 33 relative to the fixed portion of the thrust reverser 30.

Similarly to the first embodiment, the first connecting element 45 and the second connecting element 46 are located relative to each other at a distance X1 when the screw 41 is in the first position (FIG. 4) and a distance X2 when the screw is in the second position (FIG. 5). These distances have the same properties as those of the thrust reverser 30 of FIGS. 2 and 3 (see above).

In the embodiment of FIGS. 4 and 5, the damping element 50 belongs to the fixed portion of the thrust reverser 30 and is configured to receive the front end of the screw 41 when the thrust reverser 30 is in the direct thrust configuration (FIG. 4). Since the screw 41 is here axially movable, the front end of this screw is thus at a distance axially from the damping element 50 in the thrust reversal configuration (FIG. 5).

Figure 6:
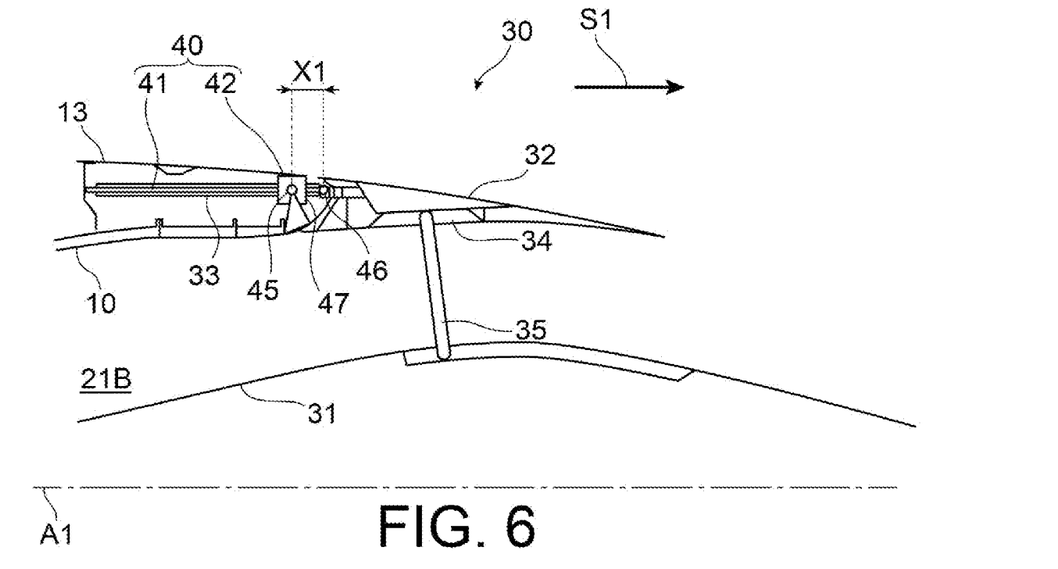
FIG. 6 is a schematic half-view in longitudinal section of a thrust reverser in accordance with a third embodiment of the invention, in the direct thrust configuration.
Figure 7:
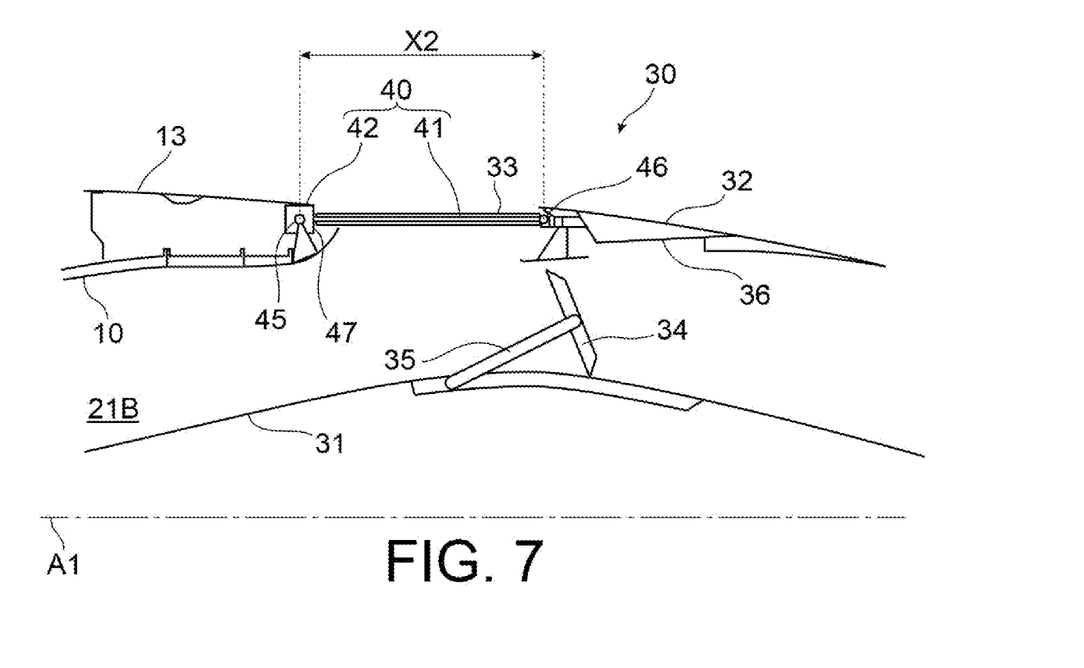
FIG. 7 is a schematic half-view in longitudinal section of the thrust reverser of FIG. 6, in the thrust reversal configuration.

FIGS. 6 and 7 illustrate a third embodiment which is described only according to the differences thereof relative to that of FIGS. 4 and 5.

In this third embodiment, the rear end of the screw 41 of the jack 40 is connected by the second connecting element 46 to the rear frame of the cascades 33 and the front end of the screw 41 is supported radially and circumferentially by the front frame of the cascades 33.

Although this has not been represented, the front end of the screw 41 can here also cooperate with a damping element in the direct thrust configuration, in a manner similar to that exposed for the previous embodiments. In the present mode, the damping element can be fastened on the fixed portion of the thrust reverser.

Figure 8:
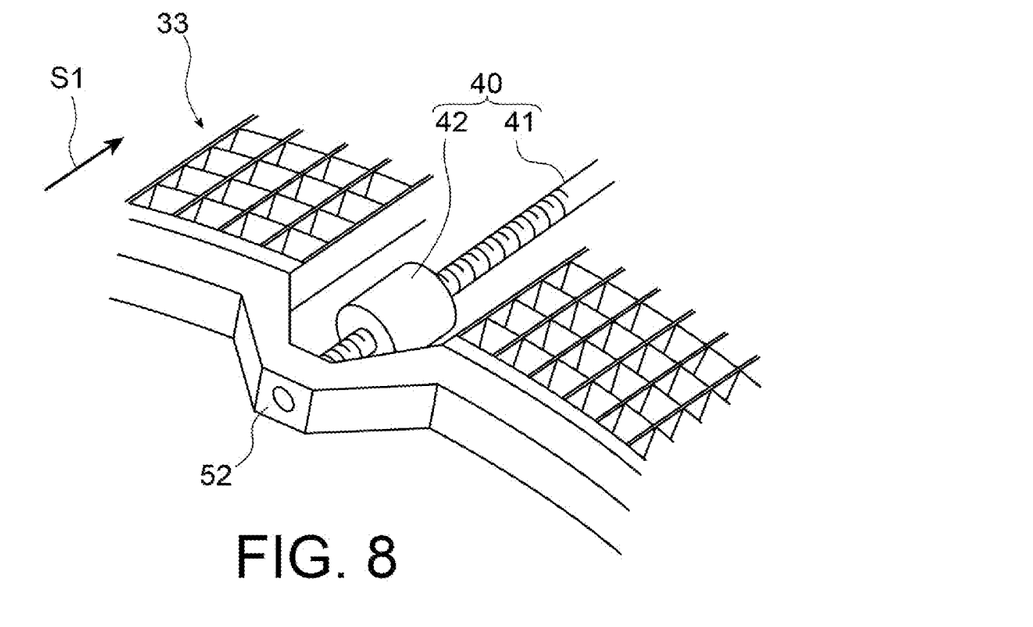
FIG. 8 is a perspective partial schematic view of cascades and of a jack of the thrust reverser of FIG. 6.

FIG. 8 schematically shows a mode for supporting the screw 41 in which the front end of the screw 41 is embedded in a portion 52 of the front frame of the cascades 33, which is preferably axially offset forwards relative to the other portions of this front frame.

Such an axial offset of the portion 52 of the front frame of the cascades 33 allows clearing a space for the nut 42 and thus maximising the stroke of the jack 40 without increasing the size of the cascades 33.

The aforementioned embedding is preferably carried out using a bearing, for example ball or roller bearing, in order to allow transmitting radial and circumferential forces while allowing a rotation of the screw at high speeds, and with a minimum of parasitic friction. Indeed, the term "embedding" means at least one blocking in translation, according to the direction of the screw, of the end of the screw relative to the portion 52 of the front frame of cascades 33. The aforementioned bearing allows carrying out for example a pivot connection or ball joint between these two elements, by being arranged at the interface between the two.

The screw front end then comes to interface with the portion 52, this end corresponding, in the direct thrust configuration, to that farthest from the interface/fastening points of the jack. It is preferably the same in the previous solutions with a damping element.

In a variant of this third embodiment, the screw 41 forms an element for guiding the cascades 33, which possibly allows eliminating the rails (not represented) for guiding the cascades 33.

In the embodiments described above, the cascades 33 are movable, namely integrated into the movable portion of the thrust reverser. The fastening of the front end of the screw on the portion 52 of the front frame of the cascades 33 allows holding and stabilising this screw, regardless of the position of the thrust reverser (direct thrust or thrust reversal).

Figure 9:
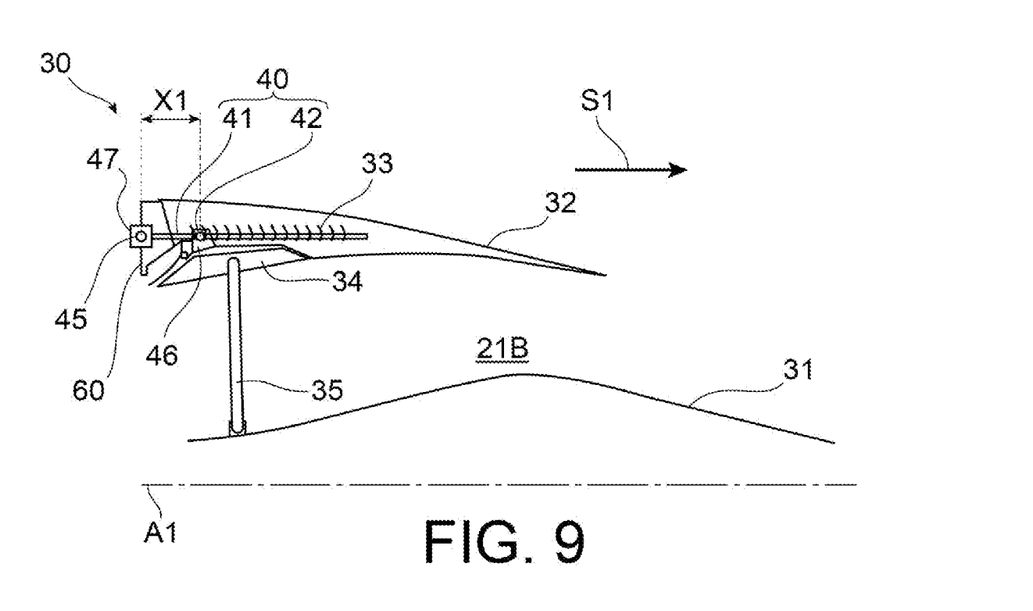
FIG. 9 is a schematic half-view in longitudinal section of a thrust reverser in accordance with a fourth embodiment of the invention, in the direct thrust configuration.
Figure 10:
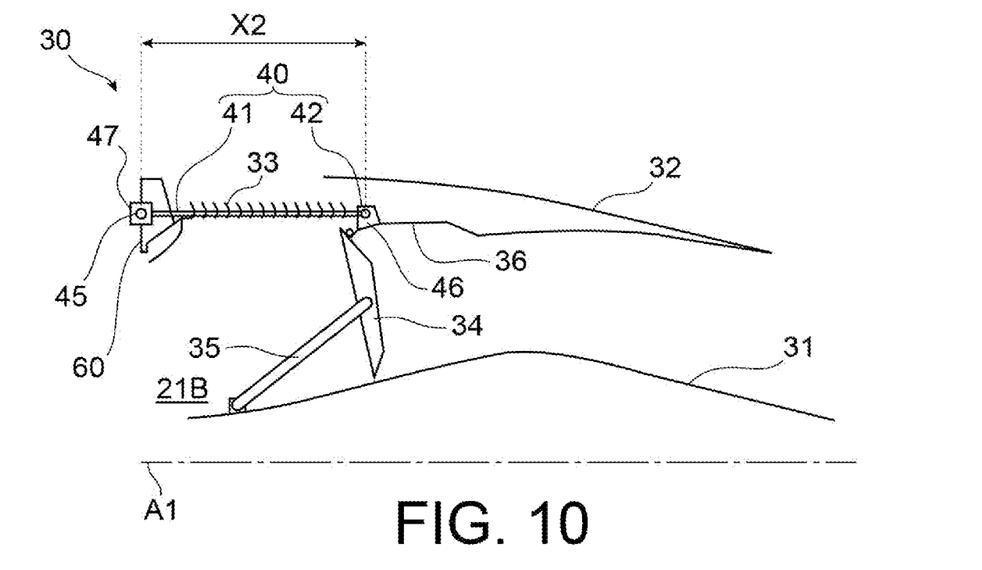
FIG. 10 is a schematic half-view in longitudinal section of the thrust reverser of FIG. 9, in the thrust reversal configuration.

The principle of the invention also applies to a thrust reverser with fixed cascades such as that illustrated in FIGS. 9 and 10 relating to a fourth embodiment.

The preceding description applies by analogy to this fourth embodiment which is essentially described below according to the differences thereof relative to the embodiment of FIGS. 2 and 3.

In the example of FIGS. 9 and 10, the fixed portion of the thrust reverser 30 comprises a front frame 60, intended to be positioned at the rear of the fan casing 10, and cascades 33 secured to this front frame 60.

In the direct thrust configuration (FIG. 9), the movable cowl 32 is in the forward position, bearing on the front frame 60, and the cascades 33 are housed within the movable cowl 32.

The displacement of the movable cowl 32, under the action of the jack 40, towards the retracted position (FIG. 10) releases the cascades 33 which thus extend axially between a rear end of the front frame 60 and the front end of the movable cowl 32.

In this example, the front end of the screw 41 of the jack 40 is connected by the first connecting element 45 to the front frame 60 of the fixed portion of the thrust reverser 30 while the nut 42 is connected by the second connecting element 46, integrating a hinge system such as a universal joint or a ball joint, to a front portion of the movable cowl 32.

The rotational drive of the screw 41, via the movement transmission mechanism 47, causes a translation of the nut 42 between the positions of FIGS. 9 and 10 such that, similarly to the preceding embodiments, the distance X1 between the first connecting element 45 and the second connecting element 46 in the direct thrust configuration (FIG. 9) is less than the stroke of the jack 40 and the distance X2 between these connecting elements 45 and 46 in the thrust reversal configuration (FIG. 10) is close to the length of the screw 41 and/or the stroke of the jack 40.

In this example, the screw 41 extends radially inside the cascades 33.

Alternatively, the screw 41 can be housed in the thickness of the cascades 33. According to this alternative, the rear end of the screw 41 is preferably embedded, in the aforementioned sense, in a portion of the rear frame of the cascades 33 which is axially rearwardly offset relative to the other portions of this rear frame, according to a principle similar to that illustrated in FIG. 8. Such an axial offset of the housing of the end of the screw relative to the rear frame of the cascades 33 makes it possible to free allows clearing a space for the nut 42 and thus maximising the stroke of the jack 40 without increasing the size of the cascades 33.

In this embodiment of FIGS. 9 and 10, an embodiment similar to that of FIG. 8 can be adopted. Indeed, although it has not been represented, it may be provided a mode for supporting the screw 41 in which the rear end of this screw is embedded in a portion of a rear frame of the cascades 33, still in the previously explained. Here also, this portion of the rear frame on which the screw is embedded can be axially rearwardly offset relative to the other portions of this rear frame.

Alternatively, for this mode, a solution with a damping element of one end of the screw jack is also possible, as that exposed within the scope of the preceding embodiments.

In each of the embodiments described above with reference to FIGS. 2 to 10, the jack 40 is devoid of an extension tube.

This allows in particular reducing the mass of the propulsion unit 1 and, within the scope of the third and fourth embodiments (FIGS. 6 to 10), reducing the disturbance of the flow passing through the cascades 33 to generate the counter-thrust.

In a variant which is not represented, the thrust reverser 30 according to any one of the first three embodiments described above comprises at least one second mechanical jack as well as primary, secondary and tertiary locks configured to lock the thrust reverser 30 in the direct thrust configuration. In a manner known per se, the primary and secondary locks can each be integrated into a respective one of the jacks of the actuating system.

According to this variant, the tertiary lock is connected to the fan casing so as to cooperate with the cascades 33 when the thrust reverser 30 is in the direct thrust configuration.

More specifically, the tertiary lock can cooperate with the rear frame of the cascades 33 in the context of the first and second embodiments and with the front frame thereof in the context of the third embodiment.

On the one hand, such a mounting of the tertiary lock ensures an effective locking in particular thanks to the respective position of the connecting elements 45 and 46 of the jack 40 and in particular to the small distance X1 separating them from each other. Indeed, in the case for example of bursting of a disc of the turbojet engine 2, fragments of this disc, which are ejected mainly in a radial direction, cannot cut both the tertiary lock and the screw 41 of the jack 40 between the connecting elements 45 and 46.

On the other hand, thus positioned, the tertiary lock does not require any additional fastening and/or reinforcement structure, which allows reducing the mass of the thrust reverser 30.

Such a configuration also allows improving the aerodynamics of the nacelle 3, relative to a conventional thrust reverser in which the tertiary lock is mounted at the rear of the thrust reverser and in which the aerodynamic lines are modified to allow such a mounting.

The invention is compatible with numerous architectures of thrust reverser 30, in particular "C" and "D" architectures, known as "C-Duct" and "D-Duct" respectively.

The invention claimed is:

1. A thrust reverser for an aircraft propulsion unit, comprising:
   a fixed portion;
   a movable portion; and
   at least one actuator, wherein
   the actuator comprises a first member and a second member which cooperate with each other so as to be able to be displaced relative to each other between a first position and a second position defining a stroke of the actuator,
   one of the first member and the second member is connected to the fixed portion of the thrust reverser by a first connecting element, wherein the first connecting element connects to a screw of the actuator,
   the other of the first member and the second member is connected to the movable portion of the thrust reverser by a second connecting element,
   the thrust reverser is configured such that a displacement of the first member and the second member relative to each other between the first position and the second position causes a translational displacement of the movable portion relative to the fixed portion respectively between a direct thrust position and a thrust reversal position, and
   when the first member and the second member are displaced relative to each other in the first position, a distance between the first connecting element and the second connecting element is less than the stroke of the actuator.

2. The thrust reverser according to claim 1, wherein the actuator is a screw jack, the screw forming the first member, the jack comprising a nut cooperating with the screw and forming the second member.

3. The thrust reverser according to claim 2, comprising a damping element receiving one end of the screw when the movable portion is in the direct thrust position, the one end of the screw being located at a distance from the damping element when the movable portion is in the thrust reversal position.

4. The thrust reverser according to claim 2, wherein one end of the screw jack is embedded in a front frame or a rear frame of cascade vanes.

5. The thrust reverser according to claim 2, wherein when the screw and the nut are displaced relative to each other in the second position, a distance between the screw and the nut is close to a length of the screw, and the stroke of the actuator is greater than 80% of the length of the screw.

6. The thrust reverser according to claim 1, wherein the actuator is devoid of an extension tube.

7. The thrust reverser according to claim 1, wherein the movable portion comprises cascade vanes.

8. The thrust reverser according to claim 7, wherein the second connecting element cooperates with a front frame or a rear frame of the cascade vanes.

9. The thrust reverser according to claim 1, further comprising fixed cascade vanes.

10. The thrust reverser according to claim 1, further comprising a tertiary lock connected to the fixed portion.

11. The thrust reverser according to claim 1, wherein the first connecting element cooperates with a front frame of the fixed portion.

12. A propulsion unit for an aircraft, comprising a thrust reverser according to claim 1.

13. The propulsion unit according to claim 12, comprising a fan casing, the first connecting element cooperating with the fan casing.

* * * * *